Dec. 17, 1940.  L. F. G. BUTLER ET AL  2,225,547
FLUID TRANSMISSION JOINT
Filed Jan. 12, 1940  2 Sheets-Sheet 1
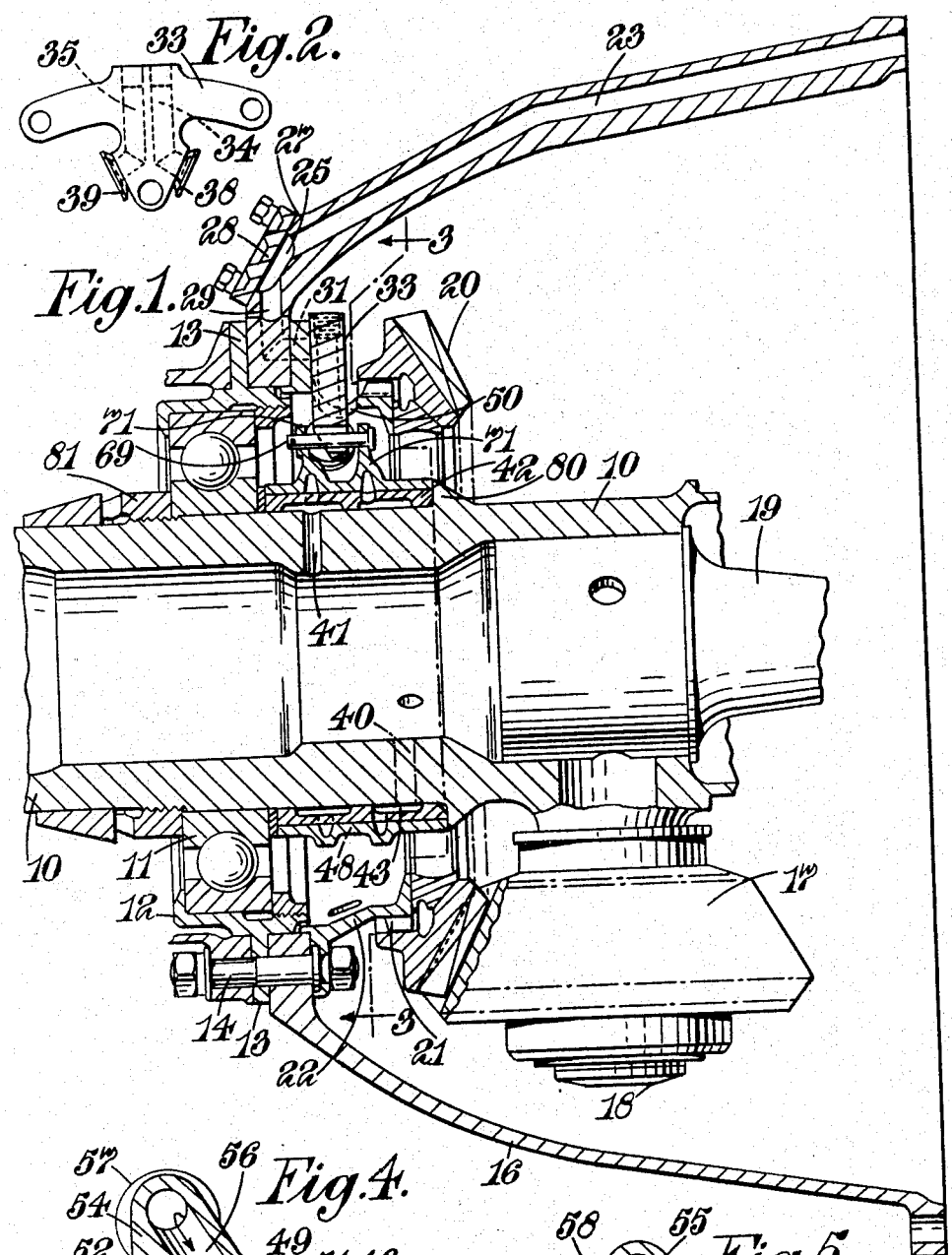
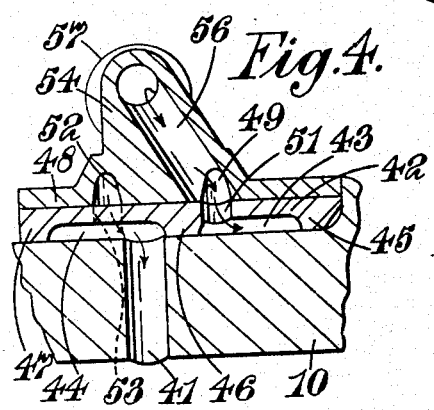
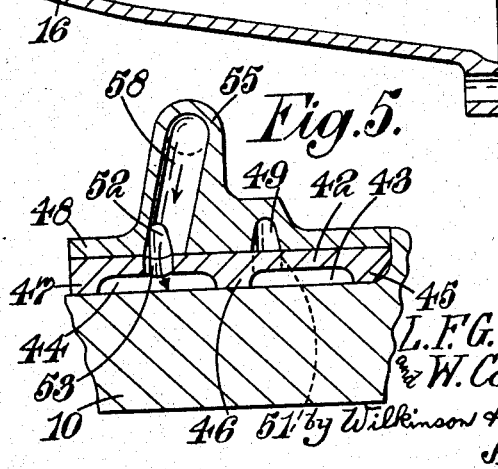
Inventors
L. F. G. Butler
& W. Cordiner
by Wilkinson & Mawhinney
Attorneys.

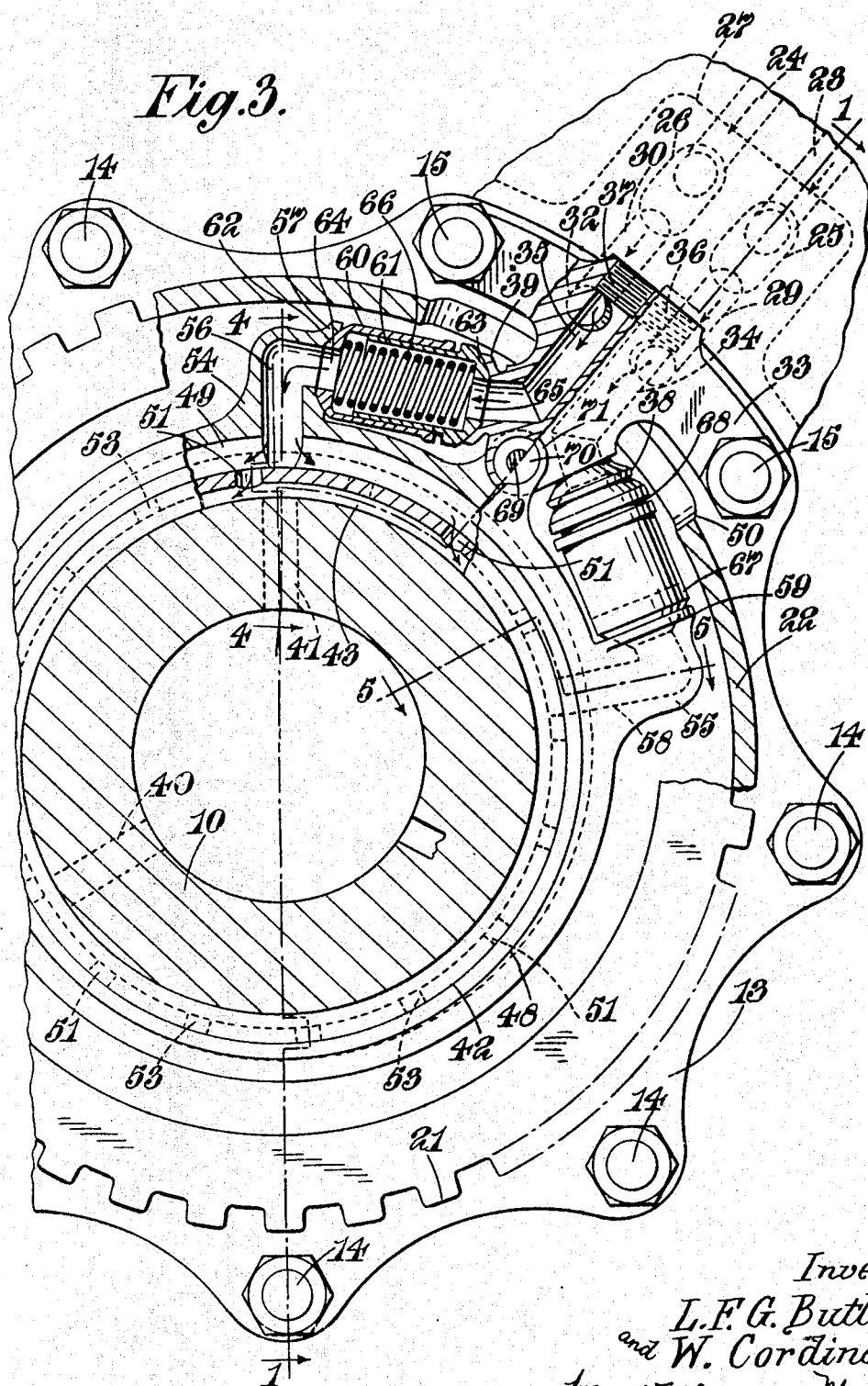

Patented Dec. 17, 1940

2,225,547

UNITED STATES PATENT OFFICE 2,225,547

FLUID TRANSMISSION JOINT

Leonard Frederick George Butler and William Cordiner, Bristol, England, assignors to The Bristol Aeroplane Company Limited, Bristol, England, a British company Application January 12, 1940, Serial No. 313,624
In Great Britain December 2, 1938

4 Claims. (Cl. 285—9)

This invention relates to fluid-transmission joints for conveying fluid between an outer part and a relatively rotatable inner part, such as a rotating shaft. The outer part is herein referred to as the "fixed part" although the invention is applicable generally where the two parts are capable of relative rotation. The object of the invention is to provide a transmission joint which shall accommodate and be unaffected by small discrepancies such as misalignment, tilting and endwise movement between the two parts.

According to the invention, a conduit for conveying fluid between an inner and outer part which are relatively rotatable comprises a section in its length capable of movement in a direction endwise of the conduit and engaging adjacent sections in the length of the conduit by spherical seatings so as to be capable of universal tilting movements in relation thereto.

A fluid-transmission joint according to the invention preferably comprises spherical seatings carried respectively by the outer part and by a member carried by the inner part which member is restrained against rotation with the inner part, and an extensible coupling having spherical ends engaging respectively with the said seatings whereby a conduit for fluid may be provided from one spherical seating to the other through the said coupling.

The said coupling preferably comprises two tubes, one slidable in the other, each having a spherical end to engage one of the said seatings, and a compression spring within the inner tube to press the two tubes apart and thereby press the spherical ends into engagement with the seatings.

The member aforesaid which is carried by the inner part and which carries one of the said spherical seatings is preferably constituted by a sleeve surrounding the inner part, which may be a shaft. In order to prevent the pressure of the spring aforesaid from adding materially to the bearing pressure between the sleeve and the shaft, the said extensible coupling is preferably so disposed that its thrust on the sleeve is tangential, or approximately tangential, with respect to the surface of the shaft.

To balance the tendency of the spring to rotate the sleeve on the shaft, two oppositely directed extensible couplings may be provided, each forming part of a separate conduit both of which enter the sleeve.

A specific embodiment of the invention will now be described, by way of example, as applied to the supply of pressure liquid to the hydraulic mechanism of a variable-pitch airscrew by way of the interior of the airscrew shaft. In the accompanying drawings, Figure 1 is a sectional elevation, taken on the line 1—1 of Figure 3 showing a joint for conveying liquid to and from the interior of an airscrew shaft for the purpose of actuating a hydraulic pitch-varying motor, Figure 2 is a face view, to the same scale as Figure 1, of the T-shaped member hereinafter described, Figure 3 is a section, on the line 3—3 of Figure 1, being drawn to an enlarged scale, and Figures 4 and 5 are sections on the lines 4—4 and 5—5 respectively of Figure 3 to explain the shape of the lugs and sleeve hereinafter described.

As shown in the drawings the airscrew-shaft 10 is carried in a main bearing 11 in a plate 12 which is flanged at 13 for connection by a set of bolts 14, 15 to a gear-casing 16 which is secured to the front cover (not shown) of the crank-case of an internal-combustion engine. The engine-shaft (not shown) carries a bevel-gear (not shown) which engages a plurality of planet-gears 17, one of which is shown in Figure 1, each planet being rotatable on a stub-axle 18 formed integrally with the airscrew-shaft 10. A tail-piece 19 extends rearwardly from the airscrew-shaft to engage a bearing in the engine-shaft whereby the airscrew-shaft is additionally supported in known manner. The planets 17 engage a bevel-gear 20 which is non-rotatably mounted by means of a splined connection 21 on a ring 22 which is fastened to the gear-casing 16 by means of the bolts 14, 15. The airscrew-shaft is thus driven by the engine shaft at a reduced speed in known manner. A variable-pitch airscrew (not shown) is carried at the forward end of the airscrew-shaft (the left-hand end as seen in Figure 1) and it is necessary to provide two separate and continuous liquid-conduits from the engine-crankcase, or another fixed part, to the interior of the shaft 10.

Formed in the gear-casing 16 are two conduits 23, 24 leading to depressions 25, 26 in a boss 27 which is normally closed by a plate 28. From the depressions 25, 26 conduits 29, 30 lead respectively into register with holes 31, 32 in the flanged portion of the ring 22. Secured to the gear-casing 16 by means of the bolts 15 (see especially Figure 3) is a T-shaped member 33 the middle portion of which is formed with passages 34, 35, plugged at their ends 36, 37 but communicating through lateral ports with the holes 31 and 32 respectively. The passages 34, 35 diverge at the inner end of the member 33 each opening into a concave spherical seating 38, 39. The member 33 passes through a suitable gap 50 in the ring 22.

It will be seen from the foregoing description that the conduit 23 communicates with the seating 38 by way of the depression 25, conduit 29, hole 31 and passage 34 and that the conduit 24 similarly communicates with the seating 39. In Figure 3 the member 33 is partly broken away to show the passage 35.

The shaft 10 is drilled with two radial holes 40 and 41 which are relatively displaced angularly (Figure 3) and longitudinally (Figure 1) of the shaft. Immediately surrounding the shaft is a bush 42 having two continuous internal grooves 43, 44 (Figures 4 and 5) bounded by lands 45, 46, 47. The groove 43 registers with the radial hole 40 (Figure 1) and the groove 44 with the hole 41 (Figure 4). The bush is surrounded by a sleeve 48 which is formed with a continuous internal groove 49, communicating with the groove 43 in the bush through a plurality of ports 51 in the bush 42, and with a similar groove 52 which communicates with the groove 44 through a similar set of ports 53.

The sleeve 48 is formed integrally with two lugs 54, 55. The lug 54 is formed with an internal elbow-shaped passage 56 which opens at the inner end into the groove 49 (Figure 4) and at the outer end into a concave spherical seating 57 (Figure 3). It will be seen that, in Figure 3, the bush 42 and sleeve 48 are partly broken away to show the groove 43, ports 51, groove 49, passage 56. In like manner the lug 55 is formed with a passage 58 which opens at its inner end to the groove 52 (Figure 5) and at its outer end into a concave spherical seating 59 (Figure 3).

It will be seen that the hole 40 in the shaft communicates with the spherical seating 59 by way of the groove 43 in the bush 42, the ports 51, the groove 49 and the passage 56 and that the port 41 communicates in like manner with the spherical seating 57 by way of the groove 44, the ports 53, the groove 52 and the passage 58.

The spherical seatings 57 and 39 are connected together by an extensible coupling shown in section in Figure 3. The coupling comprises an outer sleeve 60, having a convex spherical end 62 to co-operate with the seating 57 and an inner tube 61 slidable within the sleeve 60 and having a spherical end 63 to co-operate with the seating 39. The end 62 is cut with a hole 64 which communicates with the passage 56 and the end 63 is cut with a similar hole 65 which communicates with the passage 35. The two parts 60 and 61 are pressed apart by a compression spring 66.

The spherical seatings 59 and 38 are interconnected by a similar coupling comprising an outer sleeve 67, and an inner tube 68 the sleeve and tube being pressed apart by a compression spring (not shown) similar to the spring 66.

It will be understood that the shaft 10 rotates but that the sleeve 48 is held against rotation by its connection through the couplings to the stationary T-shaped member 33. The bush 42 will rotate with the shaft 10, being fixed thereto by being clamped between a flange 80 and a nut 81. Alternatively, the bush 42 could be arranged to rotate both with respect to the shaft and with respect to the sleeve 48.

Hydraulic liquid for varying the pitch of the airscrew blades in one direction is admitted to the conduit 23 from which it flows, in the manner already explained, and as shown by the arrows in Figure 3, to the spherical seating 38. The liquid passes through the extensible coupling to the spherical seating 59 through which it flows, in the manner already explained, to the port 40. Hydraulic liquid for varying the pitch of the blades in the other direction is admitted to the conduit 24 through which it flows, in the manner already explained, to the spherical seating 39. The liquid passes through the extensible coupling to the seating 57 from which it flows, as shown by the arrows in Figure 3, to the port 41. The liquid discharged by the hydraulic motor may be returned to the engine in different ways according to the type of air-screw. For example, when liquid under pressure is admitted to the conduit 23, the liquid discharged by the hydraulic motor may flow back through the conduit 24. Liquid from the ports 40 and 41 is constrained to follow separate paths to the hydraulic motor.

For convenience of assembly the T-shaped member 53 may be located with respect to the gear casing by means of a pin 69 passing through an eye 70 of the member 33 and engaging lugs 71 (Figure 1) formed integrally on the sleeve 48.

It will be seen that the lugs 54 and 55 on the sleeve 48 are short in their radial dimension and that the axes of the couplings 60, 67 are disposed approximately perpendicularly to the airscrew-shaft radii on which they lie. Consequently the forces exerted by springs 66 tend to balance one another and there is little resultant increase in the bearing load between sleeve 48 and bush 42.

Relative movement between the sleeve 48 and the gear-casing 16 with respect to the airscrew shaft in a direction longitudinally of the shaft axis is accommodated by tilting of the extensible couplings and consequent rotation of the spherical face 62 in the seating 57, of the face 63 in the seating 59 and of the corresponding parts of the members 67 and 68. Tilting movements between the airscrew shaft and the fixed parts or slight relative translational movements of the shaft are also accommodated by tilting of the extensible couplings in the appropriate direction. Any tilting movements of either coupling will increase the length of path for the liquid between the two concave spherical seatings which are engaged by that coupling but the coupling extends in that direction to maintain a liquid-tight joint at each end of it.

We claim:

1. A fluid-transmission joint, between a rotating shaft and an outer part, comprising a sleeve surrounding the shaft, two spherical seatings carried by the sleeve, two spherical seatings carried by the outer part and two spherical-ended extensible coupling-members each engaging at one end with a spherical seating on the sleeve and at the other end with a spherical seating on the outer part wherein the two coupling members are oppositely disposed each with its axis substantially tangential to the surface of the shaft.

2. In a fluid transmission connection, a rotary shaft having a radial fluid passage therein, a stationary fluid supply ring embracing the shaft and having a radially disposed coupling head opening circumferentially of the ring and having an annular passage in registry with the radial passage of the shaft and opening through the coupling head, a stationary support having a bearing for the shaft and provided with a coupling head opening circumferentially toward and substantially in line with the coupling head of the stationary ring, said stationary support having a fluid conduit therein opening through the coupling head thereof, and a lengthwise extensible coupling member universally connected between said coupling heads for maintaining intercommunication between the support and the ring during any variable relations between the support and the ring on the shaft.

3. In a fluid transmission connection, a stationary support having fluid conduits therein, a shaft mounted to turn in the support, a ring mounted on the shaft, said shaft and ring having intercommunicating passages therein, said ring having universal coupling sockets spaced apart and facing toward each other at one side of the ring and communicating with respective passages therein, a connector secured to the support and having a shank with openings therethrough leading from the conduits and terminating in oppositely facing universal coupling sockets, said shank of the connector extending with its sockets in substantially circumferential alinement with the respective coupling sockets of the ring, and lengthwise expanding coupling members sprung into position between the sockets of the connector shank and the respective sockets of the ring to maintain intercommunication between the support and the ring during any relative movements therebetween.

4. In a fluid transmission connection, a support having a pair of conduits therein, a shaft mounted to turn in the support, a ring mounted on the shaft, said ring having independent annular grooves therein and said shaft having radial openings independently communicating with the grooves of the ring, said ring also having radial projections spaced apart and provided with universal sockets at their ends facing toward each other and communicating respectively with the grooves of the ring, a T-shape connector secured to the support and having a shank with independent passages therein opening into the conduits of the support and provided with universal sockets at the opposite sides of the shank near the end thereof, said shank extending into the space between the radial projections of the ring and being spaced intermediately thereof, normally expansible coupling elements disposed at opposite sides of the shank and having complemental universal fittings for frictional engagement in said sockets of the ring projections and the shank for absorbing circumferential radial and lateral vibration between the support and the ring on the shaft, and anchoring means for connecting the ring to the shank of said T-shape member to hold the ring from turning during rotation of the shaft.

LEONARD FREDERICK GEORGE BUTLER.
WILLIAM CORDINER.